United States Patent [19]

Maciolek et al.

[11] 4,443,853

[45] Apr. 17, 1984

[54] OPTICAL DIGITAL SERVO CONTROL SYSTEM

[75] Inventors: Joseph R. Maciolek, Milford; Edmond D. Diamond, Huntington, both of Conn.

[73] Assignee: United Technologies Corporation, Hartford, Conn.

[21] Appl. No.: 485,137

[22] Filed: Apr. 20, 1983

Related U.S. Application Data

[63] Continuation-in-part of Ser. No. 247,417, Mar. 25, 1981, abandoned.

[51] Int. Cl.³ .................. B64C 13/50; B64C 19/00; G05D 1/08
[52] U.S. Cl. .................. 364/434; 244/17.13; 244/180; 244/181; 318/580; 318/594; 364/433
[58] Field of Search .............. 364/432, 433, 434; 244/17.11, 17.13, 178, 179, 180, 181; 318/480, 640, 580, 594; 340/870.19, 870.28

[56] References Cited

U.S. PATENT DOCUMENTS

| | | | |
|---|---|---|---|
| 3,888,772 | 6/1975 | Neuner | 455/602 X |
| 4,042,863 | 8/1977 | Von der Heide | 318/640 X |
| 4,078,749 | 3/1978 | Johnson, Jr. | 244/17.13 X |
| 4,116,000 | 9/1978 | Martin et al. | 60/242 |
| 4,117,460 | 9/1978 | Walworth et al. | 318/640 X |
| 4,119,948 | 10/1978 | Ward et al. | 340/870.19 |
| 4,164,120 | 8/1979 | Funk et al. | 318/480 X |
| 4,168,045 | 9/1979 | Wright et al. | 244/17.13 |
| 4,270,168 | 5/1981 | Murphy et al. | 364/200 |
| 4,298,839 | 11/1981 | Johnston | 340/870.28 |
| 4,313,201 | 1/1982 | Fischer et al. | 364/434 |

*Primary Examiner*—Felix D. Gruber
*Attorney, Agent, or Firm*—M. P. Williams

[57] ABSTRACT

An electrically controlled (16) mechanical actuator (13) is driven by optically generated (23) electrical power through an optically controlled (28) switch (26) in an electrically isolated module (20). Optical transducers (54, 62, 70) and feedback (29), as well as optical inputs (40, 89, etc.) to electrical signal processing equipment (46, 47, 49) in an electrically isolated module (22) dictate the electrical control (28). A helicopter flight control system is wholly digital, with solar remote power and optical intercommunication.

2 Claims, 1 Drawing Figure

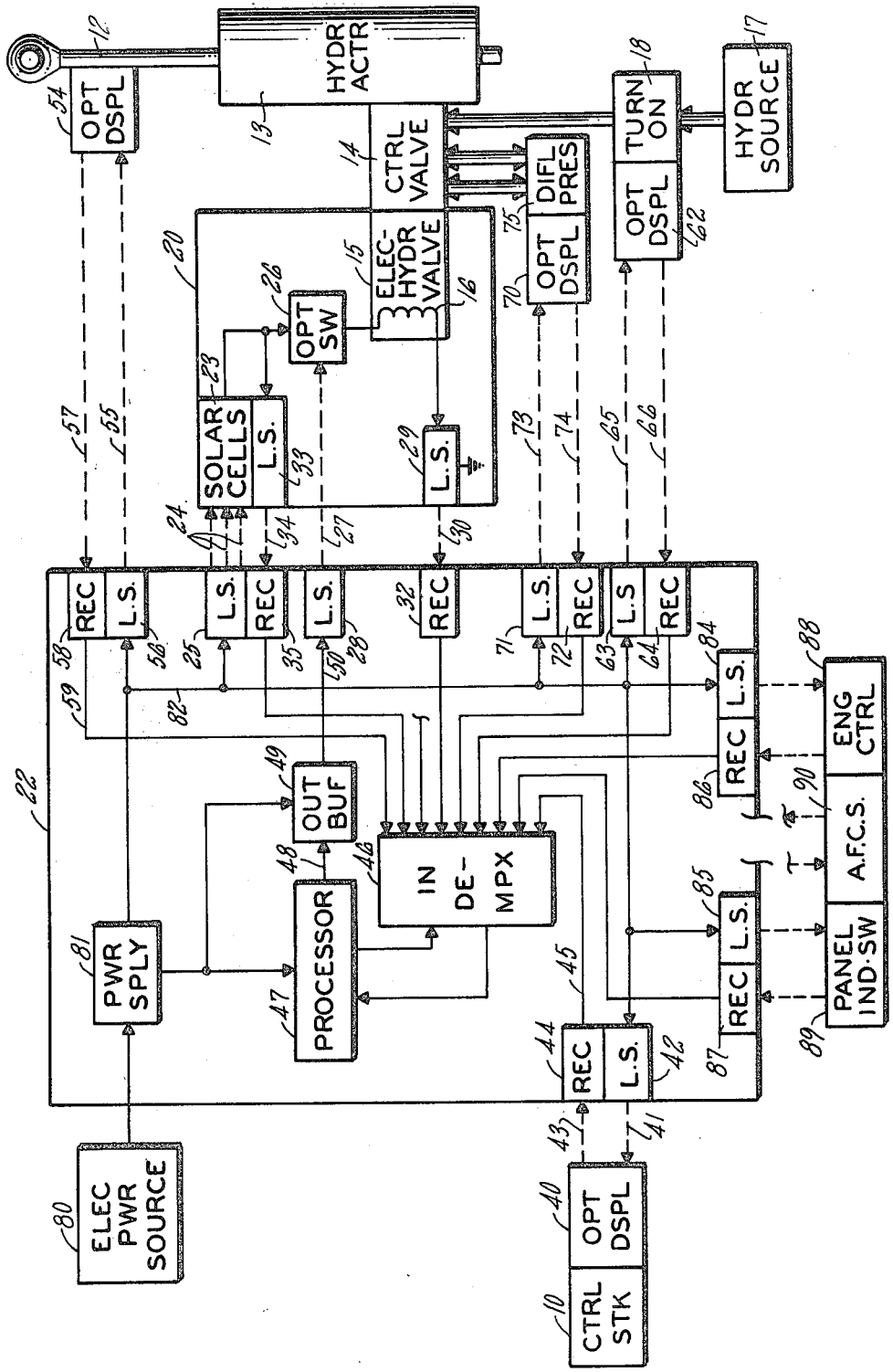

OPTICAL DIGITAL SERVO CONTROL SYSTEM

CROSS REFERENCE TO RELATED APPLICATIONS

This is a continuation-in-part of application Ser. No. 247,417, filed on Mar. 25, 1981 now abandoned.

DESCRIPTION

1. Technical Field

This invention relates to servo control systems, such as flight control systems, and more particularly to systems having dispersed components interconnected solely by optics and in which a servo loop is closed optically.

2. Background Art

One type of complex servo system is an aircraft flight control system. As an example, a helicopter has many elements which must be accurately positioned in order to cause main rotor blade and tail rotor blade pitch angle adjustments to be correct to provide the desired aerodynamic effects for controlling the attitude, speed and lift of the helicopter. In the most rudimentary systems, hand operated mechanical push rods, bell cranks and cables may be employed to cause the desired effects. In more modern helicopters, particularly large or sophisticated helicopters, hydraulic or electromechanical actuators are utilized to provide the primary control as well as to provide automatic flight control and stability augmentation. Traditionally, analog electric amplification channels with error feedback loops have been utilized to control the various actuators of the helicopter flight control systems. More recently, digital signal processing has been combined with analog/digital conversion to control helicopter flight control system actuators. A system of this type is disclosed in U.S. Pat. No. 4,270,168.

Each of these systems have certain disadvantages. Mechanical systems are subject to anomalies, such as hysteresis, backlash and friction, which tend to increase with age. Mechanical systems require a large number of actuators for autopilot and pilot effort boost purposes, and are therefore very heavy. Openings or jams in the control run, which can result from maintenance error or from battle damage in military helicopters, require additional apparatus to sense and alleviate such conditions, which further adds to the weight, cost and complexity of mechanical control systems. These considerations may dictate use of completely duplicated mechanical linkages, which adds further weight and complexity to any system. In electrical control systems, particularly of the digital type, the various mechanical components can be discretely located in an isolated fashion, all the control thereof being provided by electrical signals carried thereto from a central control means, which may be either analog or digital. When electrical control is implemented in the extreme, such a system is frequently referred to as a "fly-by-wire" system. In such a case, the weight of the system usually can be reduced (compared to mechanical or dispersed systems) depending upon the circumstances of the particular application. However, electromagnetic interference EMI can create grave problems for electrical analog or digital systems. High energy electrical pulses, lightning or EMP, generate large currents on system signal wires and require heavy shielding, especially in non-metal airframes which provide no inherent shielding. If the system is basically analog, the control effects of spurious signals of all types is very serious but may be handled through appropriate shielding and filtering. On the other hand, a system having a central digital processor can sense faulty spurious data which may be impressed on digital data in the signal wires as a consequence of lightning or EMI, etc., but cannot effectively discriminate continuous high frequency interference, and they must therefore rely on effective shielding.

A new control system technique employs optics in a variety of forms. In its simplest form, optical isolation is used so as to preclude the need for electrical signals or mechanical movements to transcend a given interface, such as a radiation containment wall in a nuclear power plant, or to ensure isolation, e.g., of a homemaker from electric shock in an appliance. Optical communication techniques are, of course, well known and quite sophisticated. In fact, optical technology has advanced to a fairly high state, providing the capacity for sending millions of bits of information per second over small bundles of optical fibers. Optical transducers, such as those capable of accurately determining position of a mechanical device, have also advanced to a fairly high state. Examples of such optical technology are given in U.S. Pat. Nos. 3,888,772, 4,116,000, 4,117,460 and 4,119,948.

Just as the use of digital equipment to control basically analog devices (servo actuators) requires additional complexity for conversion between mechanical, electrical analog, and electrical digital formats, so too does the employment of optical techniques in an otherwise basically electrical/mechanical system require additional components. Thus, the utilization of optical technology in modern systems for controlling servo actuators has not achieved its full potential.

DISCLOSURE OF INVENTION

Objects of the invention include provision of a servo control system in which the servo loop is closed optically, provision of complex servo control systems in which all of the diverse system components are interconnected solely by optical means, and provision of a wholly optical, digital servo control system.

According to the present invention, a servo control system having central, electrical signal processing and remote, electrically controlled actuators provides electrical power to the remote actuators by means of conversion of light to electrical power at the actuator, the electrical actuator command signal is transmitted optically and the result is fed back optically, whereby the servo loop is closed optically. In further accord with the invention, those portions of a servo control system which require the utilization of electrical signals are confined within electrically safe environments, provided with lightning arresters and adequate EMI and EMP shielding, the communication between them and other parts of the system being wholly optical; those portions of the system other than a central portion are provided electric power which is converted from light supplied thereto from the central portion. In accordance further with the invention, the implementation of an optically interconnected, electric signal responsive system utilizes only discrete optical transmission, such as binary digital code, pulse width modulation, and the like, whereby problems with signal levels, frequency, analog/digital conversion, and the like, are obviated.

Because electrical interference cannot be converted naturally to light, the integrity of the optical signals, in a system practicing the invention, is not impaired by EMP, EMI or lightning.

The present invention provides servo actuator control systems which can be essentially protected against electrical interference, which are inherently capable of implementation with a minimum amount of weight, which, because of the digital nature of the optical communications employed, can be rendered relatively safe by employment of self-health, diagnostic and compensation (corrective) techniques which are known in the electrical digital servo actuator control system art. The invention avoids the need for analog/digital conversion, and is easily implemented to interface with mechanical inputs to provide mechanical positional outputs, by means of electric and/or hydraulic interfaces which are readily powered and commanded solely by optics.

The invention may be implemented utilizing technology, apparatus and methods which are well known in the art in the light of the teachings which follow with respect thereto hereinafter.

The foregoing and other objects, features and advantages of the present invention will become more apparent in the light of the following detailed description of exemplary embodiments thereof, as illustrated in the accompanying drawing.

BRIEF DESCRIPTION OF DRAWING

The sole FIGURE herein comprises a simplified, illustrative, schematic block diagram of a solarized optical digital servo control system according to the present invention.

BEST MODE FOR CARRYING OUT THE INVENTION

Referring now to the drawing, the invention is described with respect to a single servo actuator, which may be but one of many in a complex servo actuator control system, such as the flight control system of a helicopter. As an example, consider the roll channel of a helicopter in which the side-to-side motion of a cyclic pitch control stick 10 is to cause a commensurate movement of the roll push rod 12, which causes the swash plate mixer to respond accordingly in a manner that the cyclic and collective pitch angle of the main rotor blades will cause the desired response of the helicopter. Systems of this type, including mechanical, analog, hydraulic and electrically-controlled hydraulic systems are known. In fact, such a system wherein pilot input at the control stick 10 is converted to movement of the push rod 12 in a system utilizing a hydraulic actuator, having automatic flight control and stability inputs thereto from a digital computing system, is disclosed in the aforementioned U.S. application.

The push rod 12 is positioned by a hydraulic actuator 13 which includes a control valve 14 operative in response to an electrohydraulic valve 15 having electromagnetic valve operating coil 16. The control valve 14 is provided hydraulic fluid under pressure from a source 17 when connected thereto by a bypass/turn-on valve 18. The apparatus 12-18 described thus far may be of any suitable type well known in the art, except for the desirability, in accordance with the invention, to provide electrical isolation between the electrohydraulic valve 15 and the remainder of the actuator apparatus, as described hereinafter.

A first aspect of the invention is that the coil 16 which controls the actuator be provided electrical signals which are generated wholly within an electric module 20 disposed adjacent the actuator 13, even though that may be remote from the portion of the system which provides the intelligent control therefor, such as a central electric module 22. The modules 20, 22, containing all of the electric signals of the system, may each be provided with suitable lightning arresters, EMI and EMP shielding so that the integrity of the electric signals therewithin is ensured. The electric signals within the module 20 are provided by solar cells 23 which receive light over a suitable light path 24 from means to provide optical power, such as a light source 25. The light source 25 may be a high intensity light source, or may be a plurality of low intensity light sources each feeding light to one or more optical fibers in the light path 24. The amount of power required to operate the coil 16 may be on the order of 50 milliwatts, such coils requiring less than 10 milliamps, through 100 ohms to 1,000 ohms of resistance. In order to be wholly discrete or digital, the current provided by the solar cells 23 is selectively passed to the coil 16 through an optical switch 26, which may simply be a light sensitive transistor which is operated in an on/off duty cycle fashion by light applied thereto by a light path 27 (such as one or more optical fibers) from a light source 28 in the central electric module 22. By providing the light source 28 with a pulse width modulation (PWM) signal indicative of the desired effect in the hydraulic actuator 13, the optical switch 26 will alternate between being highly conductive and essentially open, to provide the degree of operation of the electrohydraulic valve 15 which is desired. Since the signals to the coil 16 are unipolar (that is, can only consist of more or less average current in a single direction), the valve 15 may be biased to be in a full command position for one direction when the coil receives minimum average current from the optical switch 26, and in a full command position for the opposite direction when maximal average current is being supplied thereto by the optical switch 26. The electric signals provided to the coil 16 can be monitored in a feedback fashion (as is described in the aforementioned U.S. application) by means of a light source 29 in the ground path of the coil 16, which provides optical pulses on a path 30 (such as a fiber optic) to a suitable receiver 32 within the central electric module 22. Because this system is wholly discrete (e.g. digital, PWM) the receiver need only be any simple optical detector, such as a discretely operated phototransistor of any type. Similarly, the assurance that there is electric power available for operation of the coil 16 may be made by means of a light source 33 connected (such as with a diode limiter or the like) so as to provide an optical signal on a path 34 to a receiver 35 only when the solar cells 23 are providing adequate electric power to the switch 26 for operating the coil 16. The light sources may be LEDs, or the like. If high density data transmission or high power concentration is desired, lasers may be employed as light sources.

Pilot control over the electric signal provided to the switch 26 is also effected through optical communications. Specifically, the roll axis of the collective pitch control stick 10 (in the example herein) may have a simple optical displacement (or position) transducer 40 connected therewith. Such a transducer may take the form generally shown in U.S. Pat. No. 4,116,000. In such a case, the optical displacement transducer 40 receives sufficient light over a path 41 from means to provide optical power, such as a light source 42 within the central electrical module 22 so as to illuminate an entire code plate, either by virtue of a single light path (optical fiber) or plural light paths (one or more optical fiber per binary bit) within the light path 41. And a plurality of optical fibers provide a light path 43, including a unique path for each binary bit, to a receiver 44 which has one photodetector per binary bit. Thus, the receiver 44 will provide a plurality of electric signals, one per binary bit, in an electric path 45 to an input demultiplexer 46, which is of a well known type. In the example herein, the input demultiplexer feeds a microprocessor 47 which will convert the binary signals on the electric lines 45 to commensurate binary signals on lines 48 to an output buffer 49 where the electric signals are converted so as to provide suitable pulse width modulation (or constant width duty cycle modulation, where the nature of the case renders that desirable) on electric lines 50 to the light source 20. Thus, positioning of the control stick 10 indicating a desire to roll the aircraft clockwise or counterclockwise a certain amount will result in the processor causing pulses of light to be transmitted over the light path 27 so as to successively pulse the coil 16 in a manner that the hydraulic actuator 13 will force the push rod 12 to adjust (through operation of the mixer) the swash plate for correct cyclic pitch angle control over the main rotor blades.

In the example herein, the actuator servo loop is what is referred to as an error loop. Motion of the push rod 12 as a consequence of pulses in the coil 16 will cause a certain effect. When the push rod 12 reaches a position which is commensurate to the command indicated by the position of the control stick 10, no further changes are required in the pulses to the coil 16. In order to sense the result achieved at the push rod 12, another optical displacement sensor 54 (which may be essentially the same as the sensor 40) is connected with the push rod 12. The sensor receives light over a path 55 from means to provide optical power, such as a light source 56 and provides a plurality of binary bits of light over a path 57 to corresponding receivers 58, in a fashion described with respect to the source 42 and receivers 44. This provides a binary electrical representation on corresponding lines 59 to the input demultiplexer 46. The process or 47 has the simple task (with respect to this control loop) of sensing the difference between the desired position indicated by the signals on the lines 45 and the achieved position indicated by the signals on the lines 59, and providing signals on the lines 48 which are a function of the error, such function typically being proportional and integral gain of the error, as is well known in the art. The output buffer 49 simply provides a binary to pulse width modulation conversion, which may easily be achieved by means of a counter which is preset in each cycle, and is advanced to a terminal count with a clock of an appropriate speed, during which time the pulse is present on the line 50, and after which it is cut off. The use of an output buffer 49 allows the command rate to be applied to the coil 16 on a different cyclic basis than updating the information on the signal lines 48.

To ensure proper operation of the hydraulic actuator 13, additional optical information may be received by the central electric module 22 concerning conditions in the hydraulic system associated with the actuator 13. For instance, the assurance that the hydraulic source is connected to the actuator 13, or not, may be made at the turn-on/bypass valve 18 by means of an optical displacement detector 62 connected between a light source 63 and a receiver 64 by suitable optical paths 65, 66. And, an optical displacement sensor 70 may be connected between a light source 71 and a receiver 72 by suitable paths 73, 74 to sense the position of a device 75 responsive to differential pressure across the actuator. The displacement sensor 70 may be connected, e.g., to a spring biased dash pot 75 connected on opposite sides to the differential pressure being applied by the control valve 14 to the hydraulic actuator 13, in a manner which is well within the skill of the art. Stated alternatively, any hydraulic pressure can be converted to a mechanical position, which in turn can be detected easily by binary optical displacement sensors of the type described with respect to the sensor 40, hereinbefore. All that need be done is determine that which is to be sensed, and straightforward application of known techniques will permit utilization of the optical sensing of the present invention.

All of the electric power for the system described herein may be provided by an electric power source 80 which is fed into the central electric module 22 to feed a suitable, known type of power supply 81 to provide electric power on a line 82 to the various light sources and to provide suitable operating power to the processor, output buffer and input demultiplexer. Notice that the electric power source 80 need not be connected to the actuator electric module 20 since the electric power therefor is provided optically, by means of the solar cells 23.

As described, the foregoing represents a single actuator channel; in such a case, the processor 47 may be of an extremely small size, such as an INTEL 4040 or INTEL 8080, or the like. In such a case, the central electric module 22 of this particular channel may have need of communication with electric modules of other channels of a similar type. For instance, in the case of a pitch axis (rather than roll axis) channel, there is need to provide coupling between the pitch axis of the control stick 10 and the collective pitch controls of the helicopter. In order to control the mode of operation of the processor 47, and to monitor the operation, including the health of the channel involved, there may be need to communicate with the indicators and switches on the pilot control panel. In a typical modern sophisticated helicopter, there may be an automatic flight control system which will provide autopilot and stability functions. If the invention is implemented in a fashion described in the drawing with a single, simple computer closing the loop in each actuator channel, there is need to have inputs provided to the processor 47 corresponding to autopilot and stability functions (and possibly pilot stick feel force functions, as well). Thus there is illustrated light sources 84, 85 and receivers 86, 87 which communicate with engine controls 88 and with panel indicators and switches 89. These may be single channels operated serially, or by pulse width modulation, or parallel binary bit channels utilizing a plurality of optical paths for parallel optical signal transmission (as described with respect to the optical path 43, hereinbefore), or such other arrangement as is deemed suited in any given implementation of the invention. Although broken away for simplicity, similar optical communication is illustrated to an automatic flight control system 90. If the invention is implemented in a fashion in which a central electric module 22 incorporates a processor 47 and other related apparatus which is sufficiently powerful to control many channels, it may in fact be implemented with computers of the type described in the aforementiond U.S. Pat. No. 4,270,168 to control many channels at one time, and provide autopilot, stability and feel force functions as well, directly within the module 22. In other words, the particular manner in which the invention is implemented is not relevant, the invention being highly versatile in the utilization of optical digital technology to implement electrically immune, competent servo actuator systems.

The embodiment of the invention described thus far with respect to the drawing contemplates utilization of hydraulic power at the actuator. Of course, there may be cases where the particular design criteria of a servo actuator system would render the utilization of hydraulic power undesirable. For instance, in a combat helicopter, it may be undesirable to have hydraulic lines running aft to actuators disposed on the tail. In any such cases, an electric actuator, such as of a jackscrew type or other type, may be utilized within the precepts of the invention. In such a case, adequate power must be supplied by means of suitable number and types of solar cells 23. The movement, however, is controllable by means of an optical switch such as the optical switch 26 provided with suitable optical pulses to pass the desired current for movement of the actuator. If desired, the coil 16 could be provided with electrical bias, rather than biasing of the valve 15. Or, multibit digital code could be used (as in the input 40-44) and decoded for providing bilateral current of various magnitudes through one or more linear switches, in place of the on/off switch 26. Or, a suitable photoelectric device could be used to drive the coil 16, directly, in place of the solar cells 23 and switch 26.

To ensure adequate solar-generated electric power within a remote electric module 20, there may be provided a large number of diverse optical paths, so that destruction of one or more fibers in one optical path will not be disastrous. In fact, individual light sources, optical fibers, and solar cells can be provided, if desired: the output of each solar cell (or groups of them) being monitored by a suitable light source 33. Monitoring of the solar cell outputs can allow reconfiguration of the light supply network from the central electric module 22 to the remote electric module 20 as is necessary. Of course, the additional complexity of such a system requires additional processor time and storage within the processor 47, and may require a processor of a more sophisticated type.

The invention is described by way of example as a part of a helicopter flight control system. Of course, the invention is equally well suited to flight control systems for fixed wing aircraft, combat boats, and the like. Further, the invention is well suited to nuclear and other industrial process control systems. However, one peculiarly advantageous use of the invention is in helicopters which do not have a solid metal shielding skin, and which are subject to hostile environments in many utilizations. One aspect of the invention therefore comprises an improved helicopter flight control system.

Thus although various aspects of the invention have been shown and described with respect to exemplary embodiments thereof, it should be understood by those skilled in the art that the foregoing and various other changes, omissions and additions may be made therein and thereto, without departing from the spirit and scope of the invention.

We claim:

1. A closed-loop servo actuator system comprising:
   a mechanical actuator;
   electric signal responsive means for operating said mechanical actuator;
   input means for providing a sensible manifestation of a command for said actuator; and
   electric signal processing means interconnected between said input means and said electrically responsive means for operating said actuator;
   wherein the improvement comprises:
   a control means for said actuator;
   feedback means disposed for response to said actuator to provide an optical digital signal to said electric signal processing means indicative of the movement of said actuator;
   said electric signal processing means comprising means to provide optical power to said feedback means, said control means, and said input means;
   said input means comprising an optical transducer responsive to said sensible manifestation for providing a digital optical signal to said electric signal processing means indicative of said sensible manifestation;
   said control means comprising means to provide electric power in response to said optical power provided thereto from said electric signal processing means and optically responsive means for selectively applying said electric power to said electric signal responsive means; and
   said signal processing means providing, in response to corresponding ones of said optical signals provided thereto, optical signals to said optically responsive means.

2. An optical digital aircraft flight control system comprising:
   a plurality of actuators;
   a plurality of electric actuator control means each respectively disposed with one of said actuators;
   a plurality of flight control input devices; and
   electric signal processing means responsive to said input devices for operating said electric actuator control means;
   wherein the improvement comprises:
   said system comprising a plurality of first electrically shielded and protected modules each disposed adjacent a corresponding one of said actuators and a second electrically shielded and protected module disposed remotely of said actuators, each of said electric actuator control means being disposed within one of said first modules, said electric signal processing means being disposed in said second module, each of said first modules including photoelectric means connected to the related one of said electric actuator control means, said flight control input devices including means providing optical signals to inputs of said electric signal processing means relating to ones of said actuators corresponding to said inputs, said signal processing means providing optical signals to said photoelectric means for operating said electric actuator control means in response to optical signals received from related ones of said flight control input devices.

* * * * *